(12) United States Patent
Alasti

(10) Patent No.: US 10,472,589 B1
(45) Date of Patent: Nov. 12, 2019

(54) REMOVING TOXINS FROM EDIBLE FATS AND OILS

(71) Applicant: Artisan Industries, Inc., Stoughton, MA (US)

(72) Inventor: Perry Alasti, Stoughton, MA (US)

(73) Assignee: Artisan Industries Inc., Stoughton, MA (US)

( * ) Notice: Subject to any disclaimer, the term of this patent is extended or adjusted under 35 U.S.C. 154(b) by 0 days.

(21) Appl. No.: 16/356,799

(22) Filed: Mar. 18, 2019

Related U.S. Application Data

(60) Provisional application No. 62/666,342, filed on May 3, 2018.

(51) Int. Cl.
*C11B 3/14* (2006.01)
*B01D 1/22* (2006.01)
*C11B 1/04* (2006.01)

(52) U.S. Cl.
CPC ............... *C11B 3/14* (2013.01); *B01D 1/22* (2013.01); *C11B 1/04* (2013.01)

(58) Field of Classification Search
CPC .... C11B 1/04; C11B 3/00; C11B 3/14; B01D 1/22
See application file for complete search history.

(56) References Cited

U.S. PATENT DOCUMENTS

| | | | |
|---|---|---|---|
| 2,500,934 A * | 3/1950 | Dean | C11B 3/14 261/114.1 |
| 3,198,241 A | 8/1965 | Baird | |
| 3,393,133 A | 7/1968 | Baird | |
| 3,409,515 A | 11/1968 | Baird et al. | |
| 3,620,283 A | 11/1971 | Brown | |
| 4,804,555 A | 2/1989 | Marschner et al. | |
| 4,996,072 A | 2/1991 | Marschner et al. | |
| 2016/0152924 A1 | 6/2016 | Agarwal | |

FOREIGN PATENT DOCUMENTS

CN 103695167 3/2015

OTHER PUBLICATIONS

European Patent Office, International Search Report and Written Opinion for PCT application No. PCT/US2019/022968, dated Jul. 25, 2019.
Greyt, "Deodorization", AOCS Lipid Library, May 1, 2018, pp. 1-17.

* cited by examiner

*Primary Examiner* — Yate' K Cutliff
(74) *Attorney, Agent, or Firm* — Sunstein Kann Murphy & Timbers LLP

(57) ABSTRACT

A method for removing FFAs and toxins from edible oils, without requiring short path distillation and its attendant high temperatures and high loss of product, includes preheating a crude or refined edible oil input stream, having a toxic material content of at least about 1 PPB, to a temperature of about 400-450° F. and introducing the preheated edible oil stream to the top of a vertical stripper column operating at a pressure of about 0.1-3 Torr, typically about 2 Torr. The downward flowing edible oil stream in the stripper is stripped by superheated steam flowing in a countercurrent direction up through the stripper column. Refined and deodorized edible oil having a toxic material content of less than about 500 PPT, and typically as low as about 1 PPT, and at most about 0.2% by weight FFAs, is removed from the stripper.

27 Claims, 4 Drawing Sheets

REMOVING TOXINS FROM EDIBLE FATS AND OILS

CROSS REFERENCE TO RELATED APPLICATIONS

This application claims the benefit of U.S. Provisional Patent Application No. 62/666,342, filed 3 May 2018, titled "Removing Toxins from Edible Fats and Oils," the entire contents of which are hereby incorporated by reference herein, for all purposes.

TECHNICAL FIELD

The present invention relates to industrial-scale food processing and, more particularly, to removing toxins from edible fats and oils through thin-film stripping.

BACKGROUND ART

Edible oils, including vegetable and animal fats and oils, typically contain free fatty acids (FFAs), small amounts of mono-glycerides and di-glycerides and other undesirable contaminants. Not all contaminants are necessarily toxic. Most edible oils also contain heavy metals, furans, such as polychlorinated dibenzofurans (PCDFs), dioxins, such as polychlorinated dibenzo-p-dioxins (PCDDs), and polychlorinated biphenyls (PCBs). Depending on the type of oil and its application, a number of different processing steps may be employed to refine the oil to meet desired specifications. Conventional edible oil refining has been long practiced and is well documented in numerous publications, such as "Bailey's Industrial Oil and Fat Products," 6th Edition, Fereidoon Shahidi (editor), ISBN 978-0-471-38460-1, April, 2005, as well as other notable handbooks in the fats and oils industries. Regardless of the type of oil and its application, the final step in the refining process is generally deodorization, which is the removal of FFAs to meet residual odor specifications of the final product.

Depending on the type of oil and its intended use, fatty acids are typically reduced to about 2% by weight or less, and more commonly to less than about 1%. This is conventionally accomplished by first degassing at moderate vacuum, typically between about 50 and 150 Torr at about 250° F. or so, to eliminate moisture, oxygen and other light-ends, heating the oil to stripping temperatures, and pumping the heated oil to a deodorizer operating under deep vacuum to minimize operating temperature. However, in order to remove the odor to acceptable levels, stripping steam, typically about 1% by weight is introduced at the base of the deodorizer to aid in stripping the FFAs. In most applications, such as soybean or canola oil, the deodorization is not complete unless the oil is held at operating temperatures for about 15 to 30 minutes, with direct steam sparge injection in a holding zone to complete the deodorization.

However, animal fats and oils, in particular marine oils, are prone to degradation and loss of desirable omega-3 fatty acids, such as docosahexaenoic acid (DHA) and eicoapentaenoic acid (EPA), during the deodorization step. Therefore, lower temperatures and deeper vacuums, in the micron range, are generally employed to preserve the desirable omega-3 fatty acids, while removing a significant percentage of the FFAs and other undesirable contaminants. While conventional deodorization has been effective in reducing the FFAs with no appreciable loss of the omega-3 fatty acids, the same cannot be said about the removal of PCBs and dioxin-like PCBs. These compounds are prohibited in aquaculture, pet foods, nutritional supplements and pharmaceutical applications, with very strict limits on some of the toxins to parts-per-billion (PPB) or, in most cases, to a few parts-per-trillion (PPT) for food and nutraceutical applications. For fish oil, standards have been adopted by the World Health Organization (WHO) and by the Global Organization for EPA and DHA Omega-3 s (GOED), which is a trade association representing many companies worldwide active in the EPA and DHA omega-3 industry.

Presently, in order to remove the PCBs to these low levels, while preventing degradation and loss of the valuable omega-3 fatty acids, short path (SP) or molecular distillation has been employed. (Breivik, H & Thorstad, O., "Removal of organic environmental pollutants from fish oil by short-path distillation," Lipid Technol., Vol. 17, pp. 55-58, January, 2005.) However, these technologies present a number of disadvantages, including the normal practice of bleaching and winterization prior to distillation, and most importantly loss of the product during distillation, reportedly in the range of about 4-5%, and as high as about 15%, depending on the desired level of residual toxic contaminants in the product. The reason for this rather significant loss of the product is the severe operating conditions, including operating pressures in the micron range of vacuum, such as 0.05 Torr, and temperatures exceeding 400° F., and more typically 430° F. depending on the specifications of the product.

Short path or molecular distillation are single-stage devices. Thus, in order to meet the residual contaminant concentration requirements, the product must be processed by several such devices in series, or the product must be recycled several times through the equipment to simulate additional equilibrium stages. This practice is costly and inefficient, both in terms of energy consumption and processing time, in addition to exposing the product to high temperatures longer than ideally desired, which can cause darkening of the oil.

In addition, it has been reported that after the removal of PCBs by molecular distillation, the oil is still required to go through a deodorization process to remove remaining odorous materials, i.e., the FFAs and flavor compounds. See, for example, U.S. Pat. No. 4,996,072, the entire contents of which are hereby incorporated by reference herein, for all purposes.

Other disadvantages of molecular distillation include its high initial capital and installation costs, including cost of an appropriate vacuum system, and high operating costs associated with the relatively large number of moving parts, such as high-speed rotors, seals, bearings, etc.

SUMMARY OF EMBODIMENTS

An embodiment of the present invention provides a method for removing toxins from edible oils. The method includes receiving a feed stream of crude or chemically refined edible oil. The crude or chemically refined edible oil includes a toxic material content of at least about 1 PPB, free fatty acids (FFAs) and omega-3 fatty acids. The crude or chemically refined edible oil is preheated to a temperature of about 400-450° F. to form a preheated edible oil stream. The preheated edible oil stream is introduced proximate the top of a vertical stripper, thereby creating a downward flowing edible oil stream in the vertical stripper.

Superheated steam is introduced proximate the bottom of the vertical stripper. The superheated steam is introduced at a superheated steam to preheated edible oil ratio of about 1-10% by weight. The superheated steam is introduced, such that the superheated steam flows through the vertical stripper in a countercurrent direction, relative to the downward flowing edible oil stream. The vertical stripper is operated at a pressure of about 0.1 to 3 Torr.

The downward flowing edible oil stream is stripped with the superheated steam. Stripping the downward flowing edible oil stream removes at least a portion of the toxic material and at least a portion of the FFAs from the downward flowing edible oil stream. Stripping the downward flowing edible oil stream produces a refined edible oil and a contaminated steam stream. The refined edible oil contains: (1) at least about 90% of the omega-3 fatty acids present in the crude or chemically refined edible oil, (2) at most about 500 PPT toxic material and (3) at most about 0.5% by weight FFAs. The contaminated steam stream contains toxic material and FFAs removed from the downward flowing edible oil stream.

The contaminated steam stream is removed from the top of the vertical stripper via a first port, and the refined edible oil is removed from the bottom of the vertical stripper via a second port. The first port is distinct from the second port.

Receiving the feed stream of crude or chemically refined edible oil may include receiving a feed stream that includes fish oil and/or flaxseed oil and/or krill oil and/or seal oil and/or cod liver oil and/or squid oil and/or algae oil.

Stripping the downward flowing edible oil stream may include stripping the downward flowing edible oil stream, such that the refined edible oil contains at most about 0.2% by weight FFA or at most about 0.1% by weight FFA.

Stripping the downward flowing edible oil stream may include stripping the downward flowing edible oil stream, such that the refined edible oil is bland.

Receiving the feed stream of crude or chemically refined edible oil may include receiving a feed stream including a toxic material content of at least about 100 PPB or at least about 200 PPB.

Stripping the downward flowing edible oil stream may include stripping the downward flowing edible oil stream, such that the refined edible oil contains at least about 95% of the omega-3 fatty acids present in the crude or chemically refined edible oil or at least about 99% of the omega-3 fatty acids present in the crude or chemically refined edible oil.

Stripping the downward flowing edible oil stream may include stripping the downward flowing edible oil stream, such that yield of the refined edible oil is at least about 90% or at least about 95% or at least about 99%.

Introducing the superheated steam may include introducing the superheated steam at a superheated steam to preheated edible oil ratio of about 1-5% by weight.

Stripping the downward flowing edible oil stream may include stripping the downward flowing edible oil stream, such that the refined edible oil contains at most about 500 PPT toxic material after a single pass through the vertical stripper.

Stripping the downward flowing edible oil stream may include stripping the downward flowing edible oil stream, such that the refined edible oil contains at most about 200 PPT toxic material after a single pass through the vertical stripper or at most about 100 PPT toxic material after a single pass through the vertical stripper or at most about 1 PPT toxic material after a single pass through the vertical stripper.

Introducing the preheated edible oil stream proximate the top of the vertical stripper may include providing a vertical disc-and-tube stripper. The disc-and-tube stripper may include a housing and a plurality of alternating discs and tubes. The plurality of alternating discs and tubes may be axially disposed and axially spaced apart within the housing. Each disc may be positioned transverse to flow of the downward flowing edible oil stream through the housing. Each disc may include or define a central chimney having an outside diameter smaller than an inside diameter of a next higher tube. Thus, the vertical disc-and-tube stripper may have at least two theoretical stages. The preheated edible oil stream is introduced proximate the top of the vertical disc-and-tube stripper.

Providing the vertical disc-and-tube stripper may include providing a vertical disc-and-tube stripper having at least three theoretical stages or at least four theoretical stages or at least five theoretical stages.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1A:
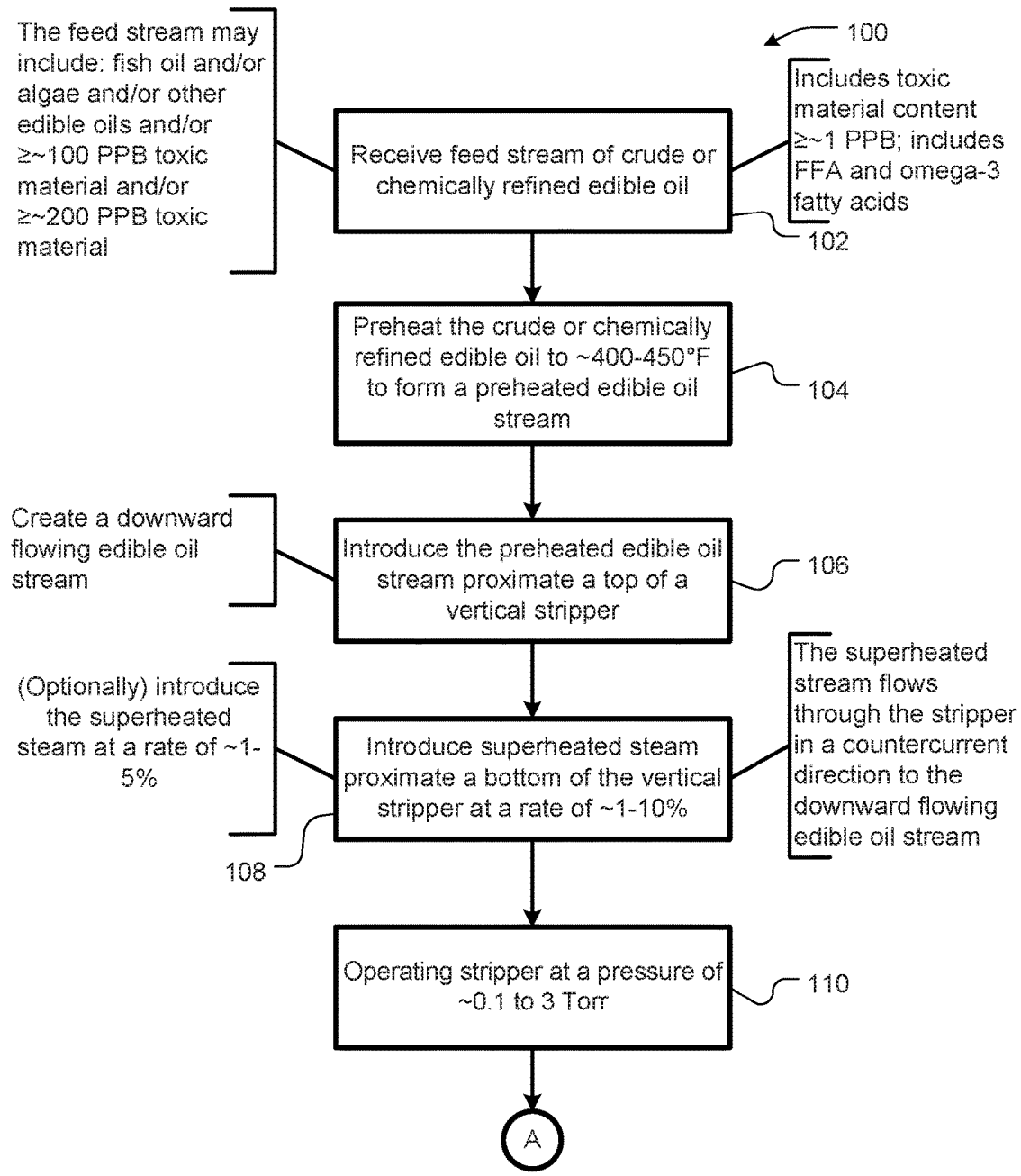
FIGS. 1a and 1b (collectively, FIG. 1) form a flowchart schematically illustrating a method for removing toxins and FFA from edible oils, according to an embodiment of the present invention.

Embodiments of the present invention provide cost effective methods for removing toxins from edible oils to about 500 PPT or less and simultaneously removing FFAs, without requiring short path or molecular distillation. Advantageously, at least about 90% of omega-3 fatty acids are retained. The edible oils may include crude or chemically refined edible oil, such as animal fats, for example dairy, and freshly refined or reverted fish oils. Typically fish oils undergo refining, bleaching, and optionally winterization prior to deodorization.

In a process according to one embodiment, crude or refined oil is first degassed to remove oxygen or other lite ends to less than about 1,000 PPM. The degassing step may be accomplished by pre-heating the oil to about 250° F. at moderate vacuum, about 50 Torr (mmHg absolute), for about 5 to 10 minutes, with a small amount of nitrogen, depending on the method of degassing. The edible oil is then heated further to stripping temperature, about 400° to 430° F., and flashed into a vapor/liquid separator, where a small fraction of the FFAs are flashed off prior to entering a vertical stripping column. This is accomplished by operating the vapor/liquid separator under relatively high vacuum, generally about 0.1 to 3 Torr. The vapor/liquid separator is typically equipped with a demister to minimize or eliminate possible liquid entrainment due to the flashing.

The stripping column may be a falling film disc and tube column. A suitable stripping column is available from Artisan Industries Inc., Stoughton, Mass. under the trade name Artisan Evaporator/Stripper™. For purposes of the present disclosure, such as for the removal of contaminants from fish oil, the stripping column includes about 2 to 5, in some embodiments about 4, theoretical stages of stripping. Other types of stripping columns, such as a pack column stripper with a height equivalent of 2 to 5 theoretical stages, may be used. However, the major disadvantage of packed columns is that they are prone to fouling, particularly when processing unrefined crude oils due to the presence of phosphatides.

Dry superheated steam is sparged into the base of the stripping column at a rate of about 1% to 10%, and typically about 5% or less, to aid in stripping and removing nearly all of the fatty acids and toxins.

The stripper performs deodorization. Depending on the desired residual level of PCBs and dioxins in the product, the stripper may operate at pressures of about 0.5 Torr or lower. Marine oils used in food applications, the residual toxins must be in the order of just a few parts per trillion (PPT). In order to achieve this nearly non-detectable level of toxins, the system may need to operate at 0.5 Torr or less, and at higher superheated steam to oil ratio, or combination thereof I discovered this shortcoming can be overcome by utilizing the Artisan Evaporator/Stripper equipment, which exhibits a low pressure drop. The Artisan Evaporator/Stripper equipment minimizes the pressure drop across the column and enables operation at less than 1 Torr levels. The Artisan Evaporator/Stripper equipment includes distribution discs that have circular holes in their centers. Such distribution disc allows a portion of the ascending stripping steam to pass through the hole, thereby collectively effectively creating a chimney, thereby reducing overall pressure drop across the entire column.

Figure 1B:
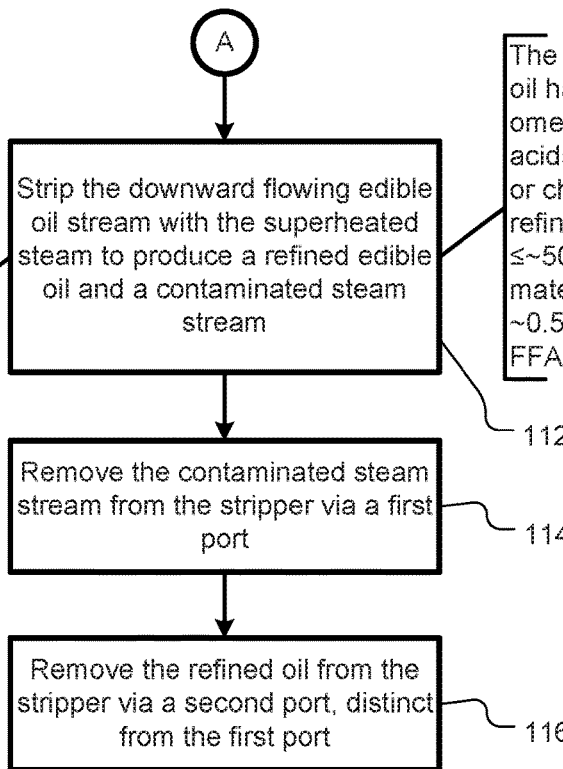

FIGS. 1a and 1b (collectively, FIG. 1) form a flowchart schematically illustrating a method 100 for removing toxins from edible oils, according to an embodiment of the present invention. At 102, a feed stream of crude or chemically refined edible oil is received. Of course, the feed stream can include a mixture of crude and chemically refined edible oil. The crude or chemically refined edible oil includes a toxic material content of at least about 1 PPB. In some embodiments, the crude or chemically refined edible oil includes a toxic material content of at least about 100 PPB or at least about 200 PPB. The crude or chemically refined edible oil also includes free fatty acids (FFAs) and omega-3 fatty acids. The feed stream may include fish oil, flaxseed oil, krill oil, seal oil, cod liver, squid oil or algae oil, which have a high content of DHA and EPA, or other high value specialty oils containing undesirable levels of toxins, such as dioxins, furans and/or PCBs.

At 104, the crude or chemically refined edible oil is preheated to about 400-430° F. to form a preheated edible oil stream. At 106, the preheated edible oil stream is introduced proximate the top of a vertical stripper, thereby creating a downward flowing edible oil stream in the vertical stripper.

At 108, superheated steam is introduced proximate the bottom of the vertical stripper at a rate of about 1-10% by weight. In some embodiments, at 108, the superheated steam is introduced proximate the bottom of the vertical stripper at a rate of about 1-5% by weight. The superheated steam flows through the vertical stripper in a countercurrent direction, relative to the downward flowing edible oil stream. At 110, the vertical stripper is operated at a pressure of about 0.1-3 Torr.

At 112, the downward flowing edible oil stream comes in intimate contact with the superheated steam to remove at least a portion of the toxic material and at least a portion of the FFAs from the downward flowing edible oil stream so as to produce refined edible oil and a contaminated steam stream. The refined edible oil contains: (1) at least about 90% of the omega-3 fatty acids present in the crude or chemically refined edible oil, (2) at most about 500 PPT toxic material and (3) at most about 0.5% by weight FFAs. The contaminated steam stream contains the toxic material and FFAs removed from the downward flowing edible oil stream and a small portion of the crude or chemically refined edible oil removed from the downward flowing edible oil stream.

Optionally, depending on operating parameters, at 112, the downward flowing edible oil stream may be stripped to make the refined edible oil essentially odor free ("bland," as that term is used in the art) and/or contain no more than about 0.2% or no more than about 0.1% by weight FFAs. Optionally, depending on operating parameters, at 112, the downward flowing edible oil stream may be stripped such that the refined edible oil contains at least about 95% or at least about 99% of the omega-3 fatty acids of the crude or chemically refined edible oil. Optionally, depending on operating parameters, at 112, the downward flowing edible oil stream may be stripped so as to retain (yield) at least 90%, at least about 95% or at least about 99% of the feed stream oil. Optionally, depending on operating parameters, at 112, the downward flowing edible oil stream may be stripped such that the refined edible oil contains at most about 500 PPT, or at most about 200 PPT, or at most about 100 PPT or at most about 1 PPT toxic material after a single pass through the vertical stripper.

At 114, the contaminated steam stream is removed from the stripper via a first port, and at 116, the refined edible oil is removed from the stripper via a second port. The second port is distinct from the first port.

Figure 2:
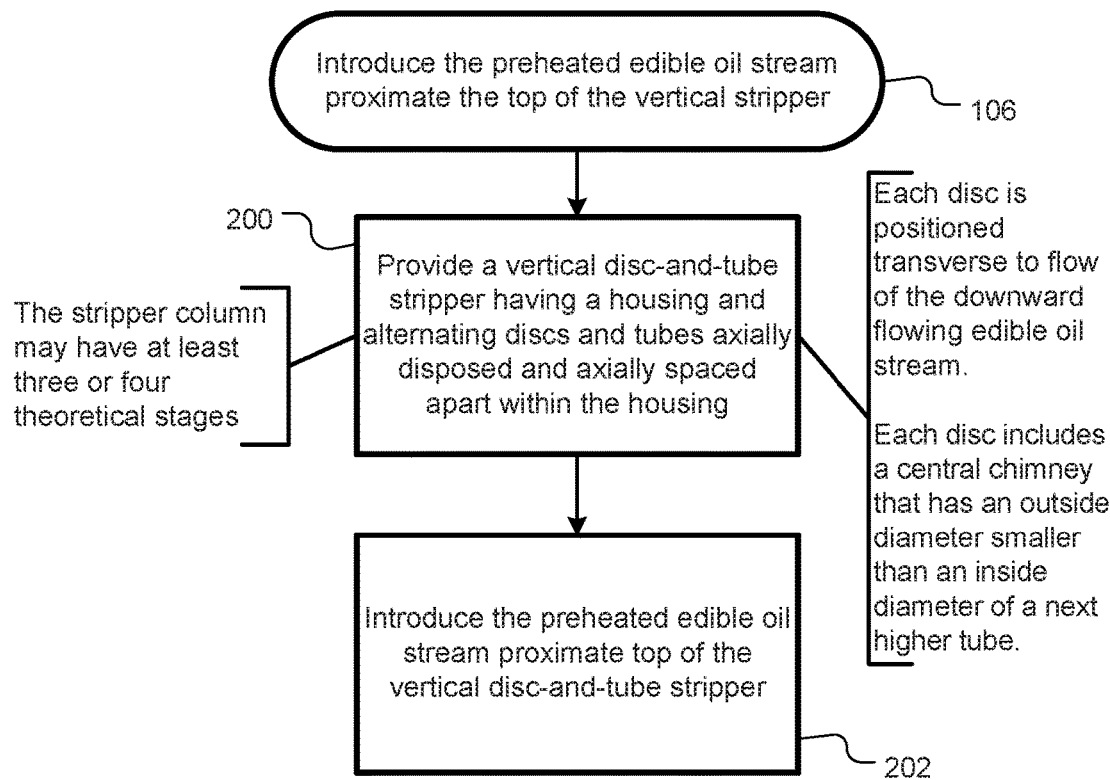
FIG. 2 is a flowchart schematically illustrating an operation of FIG. 1, specifically introducing a preheated edible oil stream proximate a top of a vertical stripper, according to an embodiment of the present invention.

FIG. 2 is a flowchart schematically illustrating operation 106 of FIG. 1, i.e., introducing the preheated contaminated edible oil stream proximate the top of a vertical stripper, according to an embodiment of the present invention. At 200, a vertical disc-and-tube stripper is provided. The disc-and-tube stripper has housing and alternating discs and tubes axially disposed and axially spaced apart within the housing. Each disc may be positioned transverse to the flow of the downward flowing edible oil stream. Each disc may include a central chimney that has a top outside diameter smaller than a bottom inside diameter of a next higher tube. The disc-and-tube stripper may have at least 2, 3, 4 or 5 theoretical stages. At 202, the preheated edible oil stream is introduced proximate the top of the vertical disc-and-tube stripper.

Figure 3:
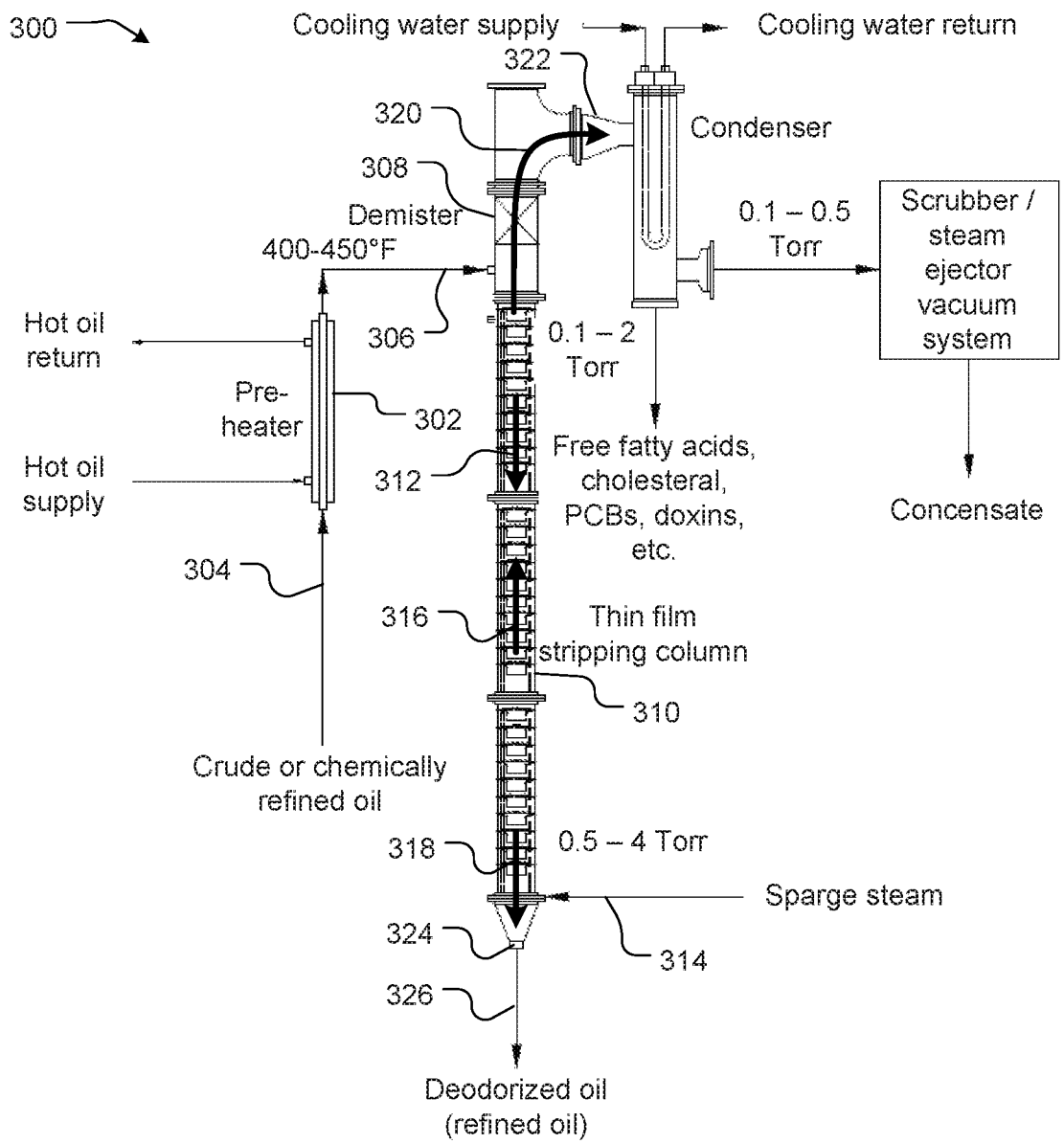
FIG. 3 is a schematic diagram of a system that may be used in performing the method of FIGS. 1 and 2, according to an embodiment of the present invention.

FIG. 3 is a schematic diagram of a system 300 that may be used in performing the method of FIGS. 1 and 2, according to an embodiment of the present invention. The system 300 includes a preheater 302 to preheat an input stream 304 of crude or refined edible oil to a temperature of about 400-440° F. The preheated edible oil 306 is fed into the top of a vertical stripper 310, thereby creating a downward flowing edible oil stream 312 in the vertical stripper 310.

The vertical stripper 310 is operated under high vacuum. The top of the vertical stripper 310 operates at about 0.1-2 Torr, and the bottom of the vertical stripper 310 operates at about 0.5-4 Torr.

Superheated sparge steam 314 is introduced at the bottom of the vertical stripper 310 at a superheated steam-to-preheated crude edible oil ratio of about 1-10% (about 1-5% in some embodiments). The superheated steam flows 316 through the vertical stripper 310 in a countercurrent direction, relative to the downward flowing edible oil stream 312.

The downward flowing edible oil stream 312 is stripped by with the upward flowing superheated steam 316 to remove FFAs and nearly all of the toxic material from the downward flowing edible oil stream 312, so as to produce:

(a) a refined edible oil 318 and (b) a contaminated steam stream 320 containing toxic material, FFAs and a very small amount of the crude oil removed from the downward flowing crude edible oil stream 312. The contaminated steam stream 320 is removed from the vertical stripper 310 via a first port 322, and the refined edible oil 318 is removed from the vertical stripper 310 via a second port 324, distinct from the first port 322. Refined edible oil 326 exiting via the second port 324 has at least about 90% of the omega-3 fatty acids present in the crude or chemically refined edible oil 304, at most about 500 PPT toxic material and at most about 0.5% by weight FFA.

While the invention is described through the above-described exemplary embodiments, it will be understood by those of ordinary skill in the art that modifications to, and variations of, the illustrated embodiments may be made without departing from the inventive concepts disclosed herein. For example, although specific parameter values, such as temperatures and pressures, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

Although some aspects of a method for removing toxins from edible oils have been described with reference to a flowchart, those skilled in the art should readily appreciate that functions, operations, decisions, etc. of all or a portion of each block, or a combination of blocks, of the flowchart may be combined, separated into separate operations or performed in other orders.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Furthermore, disclosed aspects, or portions of these aspects, may be combined in ways not listed above. In addition, embodiments disclosed herein may be suitably practiced, absent any element that is not specifically disclosed herein. Accordingly, the invention should not be viewed as being limited to the disclosed embodiments.

What is claimed is:

1. A method for removing toxins from edible oils, the method comprising:
   receiving a feed stream of crude or chemically refined edible oil, the crude or chemically refined edible oil including: a toxic material content of at least about 1 PPB, free fatty acids (FFAs) and omega-3 fatty acids;
   preheating the crude or chemically refined edible oil to a temperature of about 400-450° F. to form a preheated edible oil stream;
   introducing the preheated edible oil stream proximate a top of a vertical stripper, thereby creating a downward flowing edible oil stream in the vertical stripper;
   introducing superheated steam proximate a bottom of the vertical stripper at a superheated steam to preheated edible oil ratio of about 1-10% by weight, such that the superheated steam flows through the vertical stripper in a countercurrent direction, relative to the downward flowing edible oil stream;
   operating the vertical stripper at a pressure of about 0.1 to 3 Torr;
   stripping the downward flowing edible oil stream with the superheated steam to remove at least a portion of the toxic material and at least a portion of the FFAs from the downward flowing edible oil stream so as to produce:
     (a) a refined edible oil containing: (1) at least about 90% of the omega-3 fatty acids present in the crude or chemically refined edible oil, (2) at most about 500 PPT toxic material and (3) at most about 0.5% by weight FFA; and
     (b) a contaminated steam stream containing toxic material and FFAs removed from the downward flowing edible oil stream;
   removing the contaminated steam stream from the top of the vertical stripper via a first port; and
   removing the refined edible oil from the bottom of the vertical stripper via a second port, distinct from the first port.

2. A method according to claim 1, wherein receiving the feed stream of crude or chemically refined edible oil comprises receiving a feed stream of fish oil.

3. A method according to claim 1, wherein receiving the feed stream of crude or chemically refined edible oil comprises receiving a feed stream comprising flaxseed oil.

4. A method according to claim 1, wherein receiving the feed stream of crude or chemically refined edible oil comprises receiving a feed stream comprising krill oil.

5. A method according to claim 1, wherein receiving the feed stream of crude or chemically refined edible oil comprises receiving a feed stream comprising seal oil.

6. A method according to claim 1, wherein receiving the feed stream of crude or chemically refined edible oil comprises receiving a feed stream comprising cod liver oil.

7. A method according to claim 1, wherein receiving the feed stream of crude or chemically refined edible oil comprises receiving a feed stream comprising squid oil.

8. A method according to claim 1, wherein receiving the feed stream of crude or chemically refined edible oil comprises receiving a feed stream comprising algae oil.

9. A method according to claim 1, wherein stripping the downward flowing edible oil stream comprises stripping the downward flowing edible oil stream, such that the refined edible oil contains at most about 0.2% by weight FFA.

10. A method according to claim 1, wherein stripping the downward flowing edible oil stream comprises stripping the downward flowing edible oil stream, such that the refined edible oil contains at most about 0.1% by weight FFA.

11. A method according to claim 1, wherein stripping the downward flowing edible oil stream comprises stripping the downward flowing edible oil stream, such that the refined edible oil is bland.

12. A method according to claim 1, wherein receiving the feed stream of crude or chemically refined edible oil comprises receiving a feed stream including a toxic material content of at least about 100 PPB.

13. A method according to claim 1, wherein receiving the feed stream of crude or chemically refined edible oil comprises receiving a feed stream including a toxic material content of at least about 200 PPB.

14. A method according to claim 1, wherein stripping the downward flowing edible oil stream comprises stripping the downward flowing edible oil stream, such that the refined edible oil contains at least about 95% of the omega-3 fatty acids present in the crude or chemically refined edible oil.

15. A method according to claim 1, wherein stripping the downward flowing edible oil stream comprises stripping the downward flowing edible oil stream, such that the refined edible oil contains at least about 99% of the omega-3 fatty acids present in the crude or chemically refined edible oil.

16. A method according to claim 1, wherein stripping the downward flowing edible oil stream comprises stripping the downward flowing edible oil stream, such that yield of the refined edible oil is at least about 90%.

17. A method according to claim 1, wherein stripping the downward flowing edible oil stream comprises stripping the downward flowing edible oil stream, such that yield of the refined edible oil is at least about 95%.

18. A method according to claim 1, wherein stripping the downward flowing edible oil stream comprises stripping the downward flowing edible oil stream, such that yield of the refined edible oil is at least about 99%.

19. A method according to claim 1, wherein introducing the superheated steam comprises introducing the superheated steam at a superheated steam to preheated edible oil ratio of about 1-5% by weight.

20. A method according to claim 1, wherein stripping the downward flowing edible oil stream comprises stripping the downward flowing edible oil stream, such that the refined edible oil contains at most about 500 PPT toxic material after a single pass through the vertical stripper.

21. A method according to claim 1, wherein stripping the downward flowing edible oil stream comprises stripping the downward flowing edible oil stream, such that the refined edible oil contains at most about 200 PPT toxic material after a single pass through the vertical stripper.

22. A method according to claim 1, wherein stripping the downward flowing edible oil stream comprises stripping the downward flowing edible oil stream, such that the refined edible oil contains at most about 100 PPT toxic material after a single pass through the vertical stripper.

23. A method according to claim 1, wherein stripping the downward flowing edible oil stream comprises stripping the downward flowing edible oil stream, such that the refined edible oil contains at most about 1 PPT toxic material after a single pass through the vertical stripper.

24. A method according to claim 1, wherein introducing the preheated edible oil stream proximate the top of the vertical stripper comprises:
providing a vertical disc-and-tube stripper that comprises a housing and a plurality of alternating discs and tubes axially disposed and axially spaced apart within the housing, each disc being positioned transverse to flow of the downward flowing edible oil stream through the housing, each disc including a central chimney having an outside diameter smaller than an inside diameter of a next higher tube, such that the vertical disc-and-tube stripper has at least two theoretical stages; and
introducing the preheated edible oil stream proximate the top of the vertical disc-and-tube stripper.

25. A method according to claim 24, wherein providing the vertical disc-and-tube stripper comprises providing a vertical disc-and-tube stripper having at least three theoretical stages.

26. A method according to claim 24, wherein providing the vertical disc-and-tube stripper comprises providing a vertical disc-and-tube stripper having at least four theoretical stages.

27. A method according to claim 24, wherein providing the vertical disc-and-tube stripper comprises providing a vertical disc-and-tube stripper having at least five theoretical stages.

* * * * *